(12) United States Patent
Lessway

(10) Patent No.: US 9,114,490 B1
(45) Date of Patent: Aug. 25, 2015

(54) ADJUSTABLE FIXTURE MECHANISM

(71) Applicant: Arobotech Systems, Inc., Madison Heights, MI (US)

(72) Inventor: Richard Lessway, Bloomfield Hills, MI (US)

(73) Assignee: Arobotech Systems, Inc., Madison Heights, MI (US)

( * ) Notice: Subject to any disclaimer, the term of this patent is extended or adjusted under 35 U.S.C. 154(b) by 0 days.

(21) Appl. No.: 14/319,561

(22) Filed: Jun. 30, 2014

(51) Int. Cl.
*B23Q 3/08* (2006.01)
*B23B 25/00* (2006.01)
*B23B 29/16* (2006.01)
*B23B 29/00* (2006.01)

(52) U.S. Cl.
CPC ............... *B23Q 3/082* (2013.01); *B23B 29/16* (2013.01); *B23B 29/00* (2013.01)

(58) Field of Classification Search
CPC .......... B23B 29/16; B23Q 1/76; B23Q 3/186; B24B 41/065
USPC ........... 269/32, 228, 24–27, 6, 3; 82/157, 163
See application file for complete search history.

(56) References Cited

U.S. PATENT DOCUMENTS

| | | | |
|---|---|---|---|
| 4,399,639 A | 8/1983 | Lessway | |
| 4,519,279 A | 5/1985 | Ruggeri | |
| 4,647,097 A | 3/1987 | Lessway | |
| 4,647,100 A | 3/1987 | Lessway | |
| 4,650,237 A | 3/1987 | Lessway | |
| 5,058,468 A | 10/1991 | Lessway | |
| 5,237,780 A * | 8/1993 | Lessway | 82/157 |
| 5,285,599 A | 2/1994 | Lessway | |
| 6,699,113 B2 | 3/2004 | Lessway | |
| 6,880,436 B2 * | 4/2005 | Schlitters | 82/157 |
| 7,566,061 B2 | 7/2009 | Townsend | |
| 7,597,035 B2 | 10/2009 | Rehm | |
| 8,251,374 B2 | 8/2012 | Bronzino et al. | |
| 8,266,992 B2 | 9/2012 | Rehm | |
| 8,726,772 B2 | 5/2014 | Helm et al. | |
| 2011/0260416 A1 | 10/2011 | Helm | |
| 2012/0119452 A1 | 5/2012 | Blaser et al. | |
| 2012/0255407 A1 | 10/2012 | Maurer et al. | |
| 2012/0260779 A1 | 10/2012 | Maurer et al. | |
| 2013/0047804 A1 | 2/2013 | Maurer et al. | |
| 2013/0056941 A1 | 3/2013 | Helm | |
| 2014/0001712 A1 | 1/2014 | Helm et al. | |

FOREIGN PATENT DOCUMENTS

| | | |
|---|---|---|
| EP | 0529218 A1 | 3/1993 |
| EP | 0562180 A1 | 9/1993 |
| EP | 0602366 A1 | 6/1994 |

\* cited by examiner

*Primary Examiner* — Lee D Wilson
*Assistant Examiner* — Seahee Yoon
(74) *Attorney, Agent, or Firm* — Harness, Dickey & Pierce, PLC

(57) ABSTRACT

An adjustable fixture mechanism may include a first housing, an adjustment control plate, an adjustment member, and an adjustment control member. The first housing includes an adjustment aperture. The adjustment control plate is supported by the first housing and include an adjustment control aperture. The adjustment member may be disposed within the adjustment aperture and include a proximal end, a distal end and a first central axis extending through the proximal and distal ends. The adjustment control member may be disposed within the adjustment control aperture and include a proximal end and a distal end. The adjustment control member may be rotatable within the adjustment control aperture about a second central axis that is offset from the first central axis. The distal end of the adjustment control member may include a ramped surface extending about the second central axis and in contact with the proximal end of the adjustment member.

18 Claims, 14 Drawing Sheets

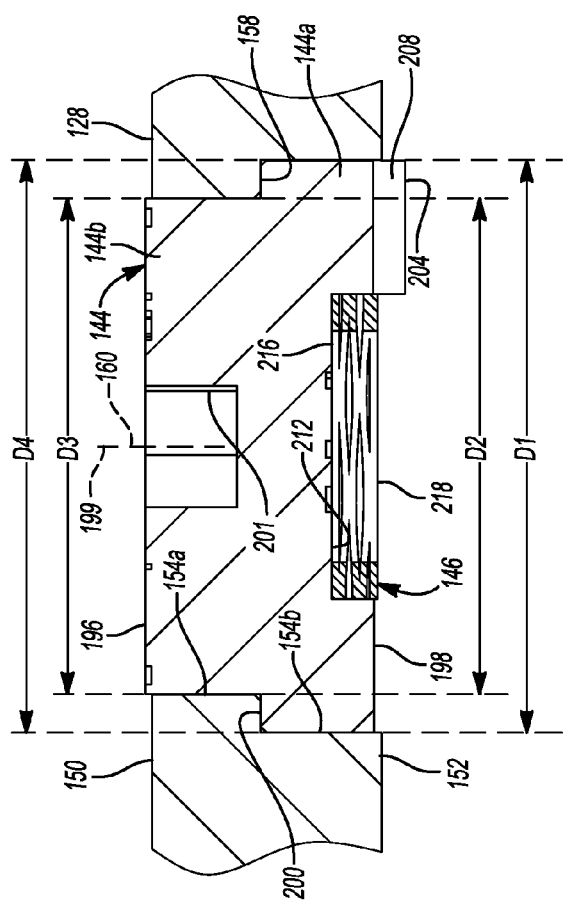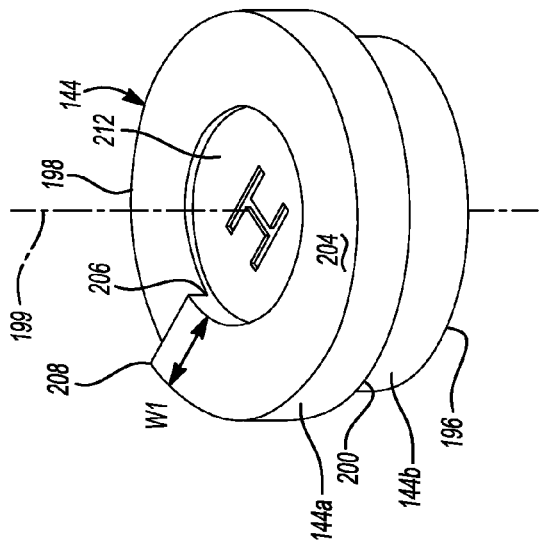
Fig-12
Fig-13

ADJUSTABLE FIXTURE MECHANISM

FIELD

The present disclosure relates to an adjustable fixture mechanism, and more particularly to a device and method for metered adjustment of a fixture mechanism.

BACKGROUND

This section provides background information related to the present disclosure and is not necessarily prior art.

Fixtures are commonly used for securing a workpiece prior to a machining operation, such as grinding, milling, boring, or the like. For example, gripping arms on the fixture may secure the workpiece while a cutting tool, such as a blade or bit removes material from the workpiece. In these types of operations, it is very important to precisely locate and secure the workpiece relative to the fixture, so that the location of the workpiece relative to the machine tool is accurately controlled. Known fixtures may include an adjustment mechanism for adjusting the position or location of the fixture, including the gripping arms, to ensure the accuracy of the machining operations relative to the workpiece. Such adjustment mechanisms may require a guess-and-check form of operation, where the user must adjust the position of the fixture or gripping arms, and then measure the position of the fixture or gripping arms to ensure that the new position will allow for an accurate machining operation. Often the user must perform more than one or several iterations of this guess-and-check adjustment process to achieve a desired positioning. This can be time-consuming and costly.

While known fixtures and adjustment mechanisms have proven to be acceptable for their intended purposes, a continuous need for improvement in the relevant arts remains.

SUMMARY

This section provides a general summary of the disclosure, and is not a comprehensive disclosure of its full scope or all of its features. According to one particular aspect, the present disclosure provides an adjustable fixture mechanism. The adjustable fixture mechanism may include a first housing, an adjustment control plate, an adjustment member, and an adjustment control member. The first housing may include an adjustment aperture. The adjustment control plate may be supported by the first housing and include an adjustment control aperture. The adjustment member may be disposed within the adjustment aperture and include a proximal end, a distal end and a first central axis extending through the proximal and distal ends. The adjustment control member may be disposed within the adjustment control aperture and include a proximal end and a distal end. The adjustment control member may be rotatable within the adjustment control aperture about a second central axis that is offset from the first central axis. The distal end of the adjustment control member may include a ramped surface extending about the second central axis. The ramped surface may contact the proximal end of the adjustment member.

In some configurations, the ramped surface extends helically about the second central axis.

In some configurations, the proximal end of the adjustment control member includes a plurality of indicia.

In some configurations, the adjustment control plate includes at least one metering feature In some configurations, the adjustment control member includes an annular lip and the adjustment control aperture includes an annular shoulder for engaging the annular lip to secure the adjustment control member within the adjustment control aperture.

In some configurations, a biasing member biases the annular lip into engagement with the annular shoulder.

In some configurations, the distal end of the adjustment control member includes an axially extending recess.

In some configurations, the axially extending recess is at least partially defined by the ramped surface.

In some configurations, the biasing member is at least partially disposed within the axially extending recess.

In some configurations, adjustable fixture mechanism further includes a second housing, a supporting body, and a biasing member. The supporting body is disposed between the first and second housing. The biasing member includes a first end engaging the supporting body and a second end engaging the distal end of the adjustment control member.

According to another particular aspect, the present disclosure provides an adjustable fixture mechanism. The adjustable fixture mechanism may include a housing, an adjustment control plate, an adjustment member, and adjustment control member. The housing may include an adjustment aperture. The adjustment control plate may be coupled to the housing and may include an adjustment control aperture. The adjustment member may be disposed within the adjustment aperture and may include a proximal end and a distal end. The adjustment control member may be disposed within the adjustment control aperture and may include a proximal end and a distal end. The distal end of the adjustment control member may include a ramped helical surface. The adjustment control member may be eccentrically aligned with the adjustment member, such that the ramped helical surface engages the proximal end of the adjustment member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 12 is a partial cross-sectional view of the adjustment assembly of FIG. 11;

FIG. 13 is a perspective view of an adjustment dial of the adjustment assembly of FIG. 11;

Corresponding reference numerals indicate corresponding parts throughout the several views of the drawings.

DETAILED DESCRIPTION

Figure 1:
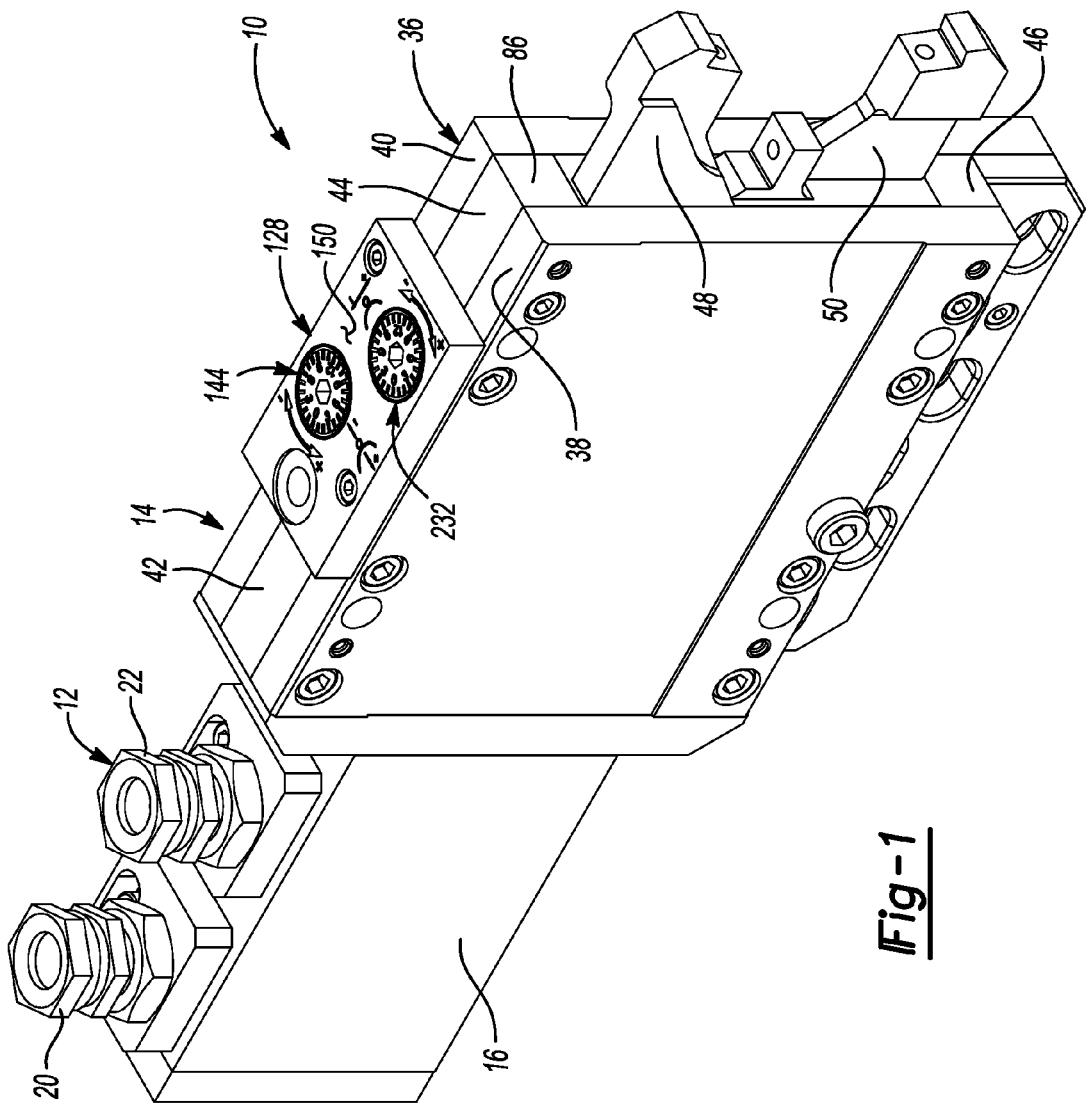
FIG. 1 is a perspective view of an adjustable fixture mechanism, including adjustable gripping arms, in accordance with the principles of the present disclosure.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-10, an adjustable fixture mechanism constructed in accordance with the principles of the present disclosure is illustrated and identified at reference character 10. According to one exemplary use, the adjustable fixture mechanism 10 may be used in conjunction with a machine tool (not shown) to secure a workpiece (not shown) during for various machining operations such as milling, grinding, boring, or other similar operations. It will be appreciated however, that the adjustable fixture mechanism 10 may be adapted for use in securing a workpiece prior to, and/or during, other fabrication or assembly-type operations.

The adjustable fixture mechanism 10 may include an actuator subassembly 12 and an engagement subassembly 14. The actuator subassembly 12 may be coupled with the engagement subassembly 14 for actuating and controlling the movement of the engagement subassembly 14, as will be described in more detail below.

The actuator subassembly 12 may include a housing 16 and an actuation member or rod 18. The housing 16 may include a hydraulic fluid inlet 20, a hydraulic fluid outlet 22, and a cylinder (not shown). The hydraulic fluid inlet 20 may be in fluid communication with the cylinder for controlling the position of the rod 18. In this regard, the rod 18 may extend from a proximal end 26 to a distal end 28 along an axis 30. The proximal end 26 of the rod 18 may be slidably disposed within the cylinder. The rod 18 may include a neck portion 32, such that the distal end 28 of the rod 18 defines a collar 34. During operation of the adjustable fixture mechanism 10, hydraulic fluid may be supplied to the hydraulic fluid inlet 20 to cause the rod 18 to move within the cylinder in a direction substantially parallel to the axis 30. As will be explained in more detail, below, movement of the rod 18 within the cylinder can cause the engagement subassembly 14 to engage and/or release the workpiece.

The engagement subassembly 14 may include a housing 36 having a first side plate 38 and a second side plate 40. The engagement subassembly 14 may further include a supporting body 42, an upper slide plate 44, a lower slide plate 46, a first gripping arm 48, a second gripping arm 50, a first adjustment subassembly 52, and a second adjustment subassembly 54. The first side plate 38 may be a substantially rectangular shaped member having an inner surface 56 and an upper surface 58. The inner surface 56 may include a substantially T-shaped camming slot 60 having a horizontal portion or leg 60a and a vertical portion or leg 60b. The horizontal leg 60a may extend in a direction substantially parallel to the axis 30. The vertical leg 60b may extend in a direction substantially perpendicular to the axis 30. The upper surface 58 of the first side plate 38 may include a first adjustment bore 62 and a second adjustment bore 64. The first and second adjustment bores 62, 64 may be in communication with the vertical leg 60b of the slot 60. In this regard, the first and second adjustment bores 62, 64 may extend in a direction substantially parallel to the vertical leg 60b.

The second side plate 40 may be a substantially rectangular shaped member having an inner surface 68 and an upper surface 70. The inner surface 68 may include a substantially L-shaped camming slot 72 having a horizontal portion or leg 72a and a vertical portion or leg 72b. The horizontal leg 72a may extend in a direction substantially parallel to the axis 30. The vertical leg 72b may extend in a direction substantially perpendicular to the axis 30. The upper surface 70 of the second side plate 40 may include a third adjustment bore 74 and a fourth adjustment bore 76. The third and fourth adjustment bores 74, 76 may be in communication with the vertical leg 72b of the slot 72. In this regard, the third and fourth adjustment bores 74, 76 may extend in a direction substantially parallel to the vertical leg 72b.

Figure 3:
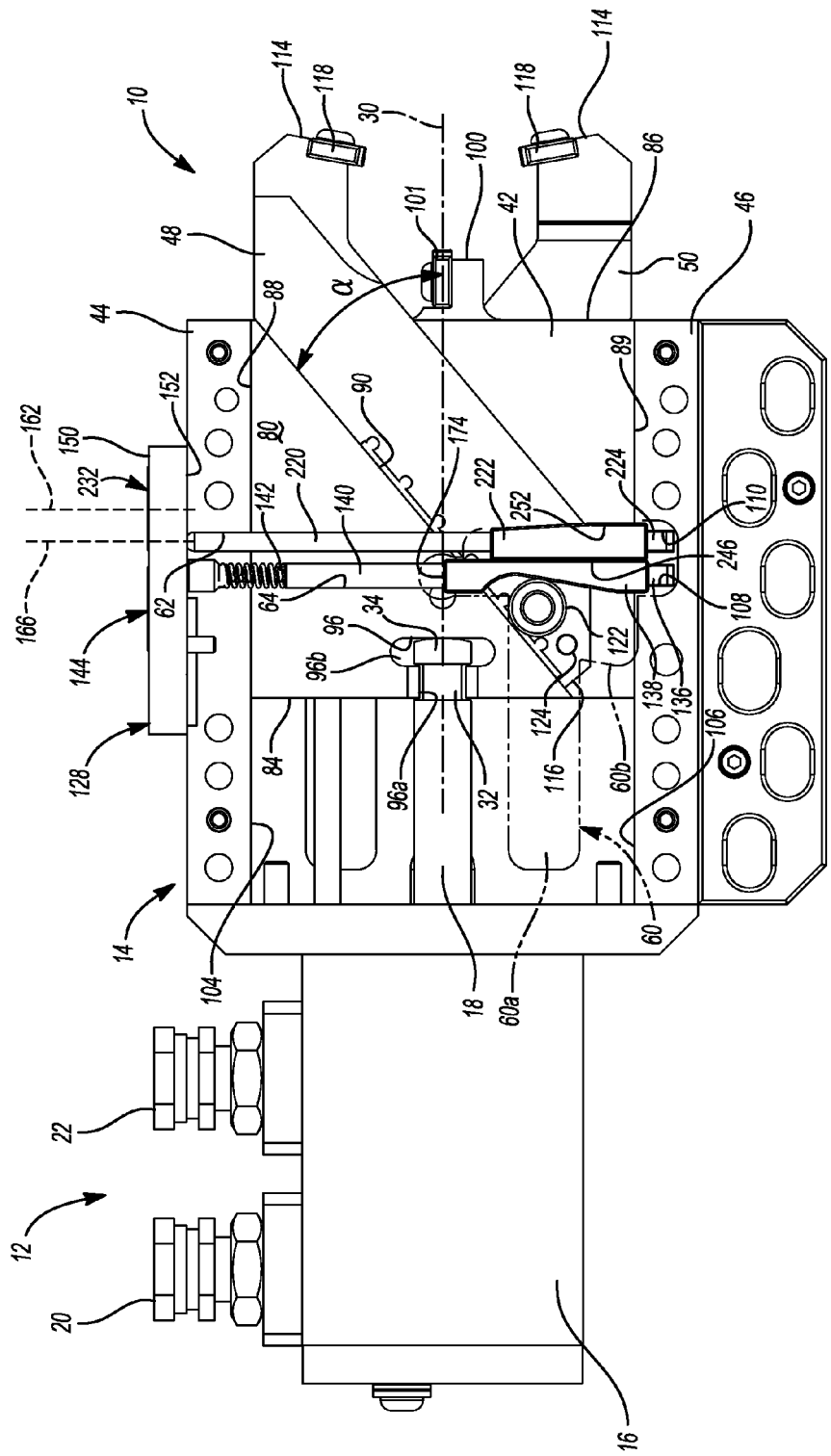
FIG. 3 is a side view of a first side of the adjustable fixture mechanism of FIG. 1, the adjustable gripping arms shown in a first position.
Figure 4:
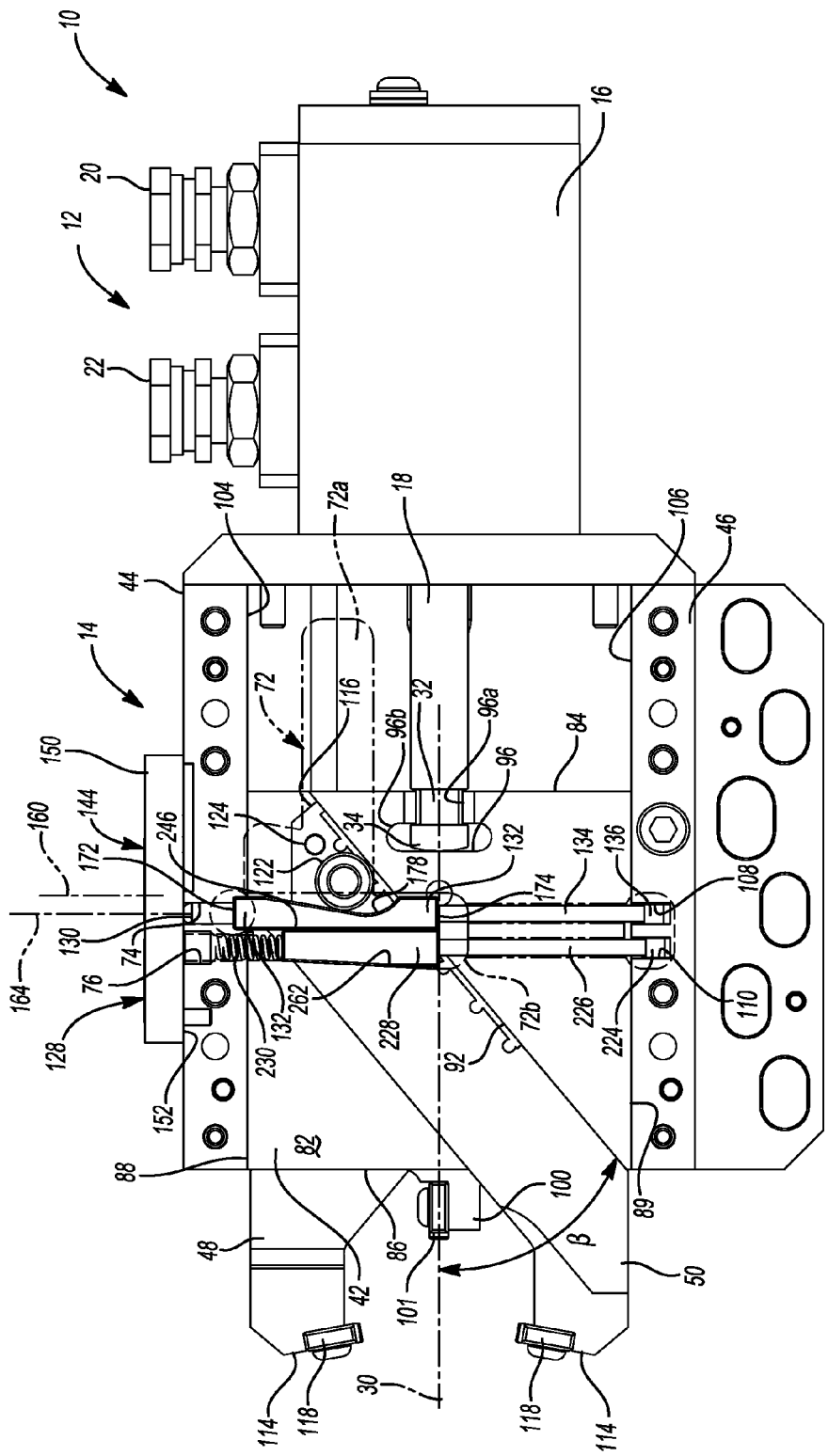
FIG. 4 is a side view of a second side of the adjustable fixture mechanism of FIG. 1, the adjustable gripping arms shown in the first position.

The supporting body 42 may be a substantially rectangular shaped member having a first outer surface 80, a second outer surface 82, a proximal end 84, a distal end 86, a first slide surface 88, and a second slide surface 89. In an assembled configuration, the supporting body 42 may be disposed between the first and second side plates 38, 40, such that the first outer surface 80 slidably engages the inner surface 56, and the second outer surface 82 slidably engages the inner surface 68. The first outer surface 80 may include a first arm receiving slot or channel 90. As illustrated in FIG. 3, the channel 90 may open into the distal end 86 of the supporting body 42 and form an angle α with the axis 30. In some configurations, the angle α may be substantially equal to forty-five degrees (45°). The second outer surface 82 may opposed the first outer surface 80, and may include a second arm receiving slot or channel 92. As illustrated in FIG. 4, the channel 92 may open into the distal end 86 of the supporting body 42 and form an angle β with the axis 30. In some configurations, the angle β may be substantially equal to forty-five degrees (45°). Accordingly, it will be appreciated that in some configurations, the channels 90, 92 may form an X-shaped configuration, including a ninety degree (90°) angle therebetween.

The proximal end 84 of the supporting body 42 may include a rod receiving slot 96. The rod receiving slot 96 may be substantially T-shaped, including a horizontal portion 96a and a vertical portion 96b, such that in an assembled configuration, the neck 32 of the rod 18 is disposed within the horizontal portion 96a, and the collar 34 is disposed within the vertical portion 96b. The distal end 86 of the supporting body 42 may include a first workpiece support element 100 extending therefrom. The first workpiece support element 100 may be located substantially in the middle of the distal end 86, and may further include a first workpiece support pad 101 attached thereto.

The upper and lower slide plates 44, 46 may be substantially rectangular shaped members having third and fourth slide surfaces 104, 106, respectively. With respect to the views shown in FIGS. 2 and 3, the third slide surface 104 may be an upper surface, and the fourth slide surface 106 may be a lower surface. In an assembled configuration, the third slide surface 104 may slidably engage the first slide surface 88 of the supporting body 42, and the fourth slide surface 106 may slidably engage the second slide surface 89 of the supporting body, thereby allowing the supporting body 42 to slide between the upper and lower slide plates 44, 46, as will be explained in more detail below.

The lower slide plate 46 may further include first and second channels 108, 110. The first and second channels 108, 110 may extend in a direction substantially perpendicular to the axis 30. In this regard, the first channel 108 may be substantially parallel to the second channel 110. In the assembled configuration the first and second channels 108, 110 may communicate with, or otherwise open into, the legs 60b and 72b of the camming slots 60 and 72, respectively.

The first gripping arm 48 may be substantially similar to the second gripping arm 50. Accordingly, like reference numerals will be used to describe similar features and, except as otherwise provided, references herein to the first gripping arm 48 will be understood to apply equally to the second gripping arm 50. In an assembled configuration, the first gripping arm 48 may be disposed in the channel 90 and the second gripping arm 50 may be disposed in the channel 92. The first gripping arm 48 may extend between a proximal end 114 and a distal end 116. The proximal end 114 may be a gripping end, including a second workpiece support pad 118. The distal end 116 may include a first aperture 120 and a second aperture 121. The first aperture 120 may support a cam roller 122. The second aperture 121 may support a camming pin 124. In an assembled configuration, the cam roller 122 and camming pin 124 of the first gripping arm 48 may be disposed within the camming slot 60, while the cam roller 122 and camming pin 124 of the second gripping arm 50 may be disposed within the camming slot 72.

The first adjustment subassembly 52 may include an adjustment control plate 128, a first adjustment member or rod 130, a first adjustment guide 132, a first push rod 134, a rocker member 136, a second adjustment guide 138, a second push rod 140, a first biasing member 142, an adjustment control member 144, and a second biasing member 146. As will be explained in more detail below, the first adjustment subassembly 52 can be used to adjust the horizontal or lateral position of the second workpiece support pads 118 (thereby adjusting the horizontal or lateral position of a centerline of a cylindrical workpiece when the workpiece is gripped by the support pads 101, 118), relative to the view in FIG. 3.

Figure 2:
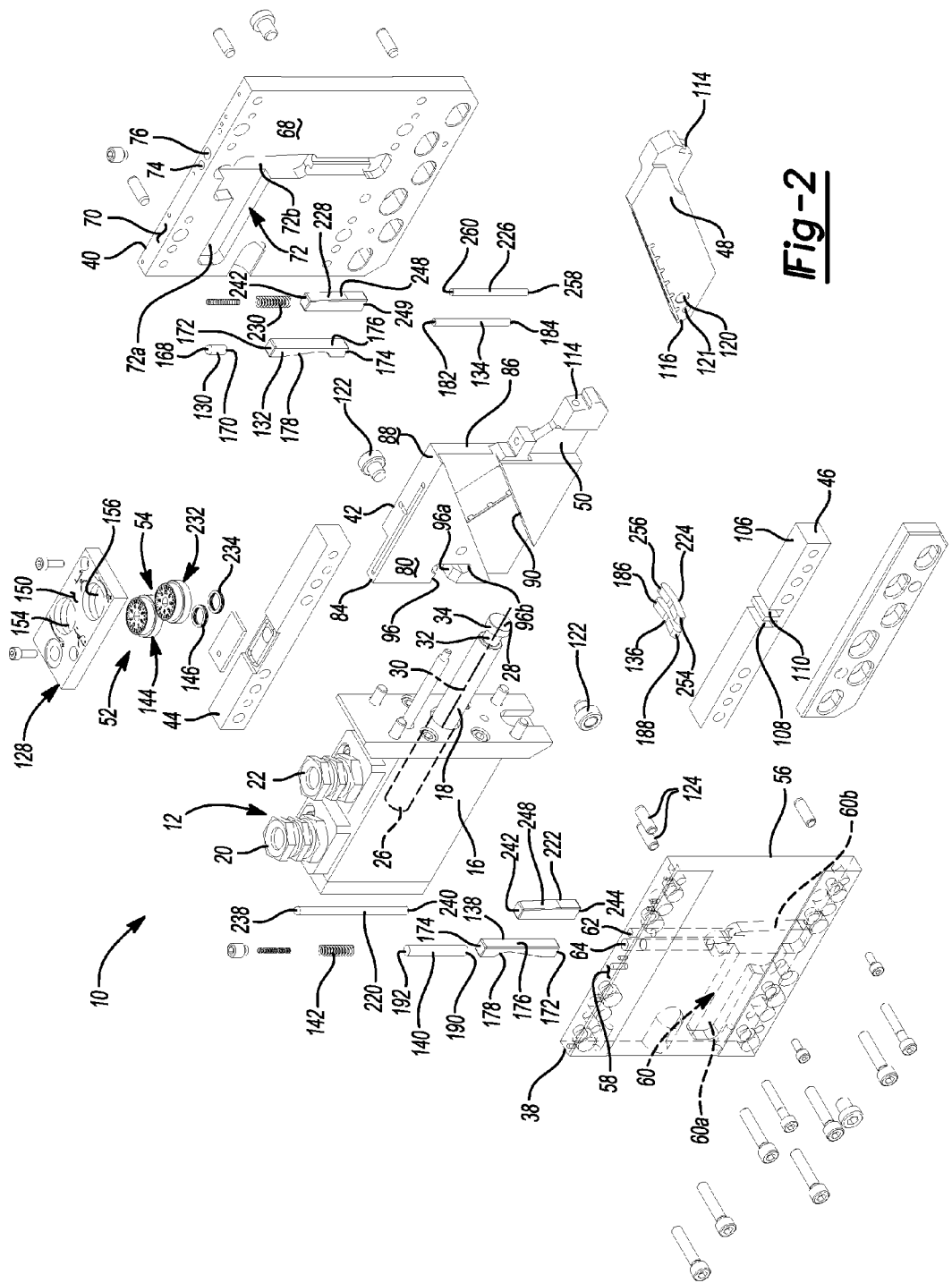
FIG. 2 is a partially exploded view of the adjustable fixture mechanism of FIG. 1.

The adjustment control plate 128 may be partially defined by first and second surfaces 150, 152, and may include at least one metering feature 153 (FIG. 11), and first and second adjustment control apertures 154, 156 (FIG. 2). As will be explained in more detail below, the at least one metering feature 153 may allow the user to precisely adjust the position of the first and second gripping arms 48, 50.

With reference to FIG. 12, the first and second adjustment control apertures 154, 156 may extend between the first and second surfaces 150, 152. The first adjustment control aperture 154 may be substantially similar to the second adjustment control aperture 156. Accordingly, like reference numerals will be used to describe similar features and, except as otherwise provided, references herein to the first adjustment control aperture 154 will be understood to apply equally to the second adjustment control aperture 156. The first adjustment control aperture 154 may include a first portion 154a and a second portion 154b. The first and second portions 154a, 154b may define an annular shoulder 158 extending therebetween. In this regard, the first portion 154a may be formed in the first surface 150 and define a cylindrical shape having a first diameter D1. The second portion 154b may be formed in the second surface 152 and define a cylindrical shape having a second diameter D2 that is greater than the first diameter D1.

Figure 11:
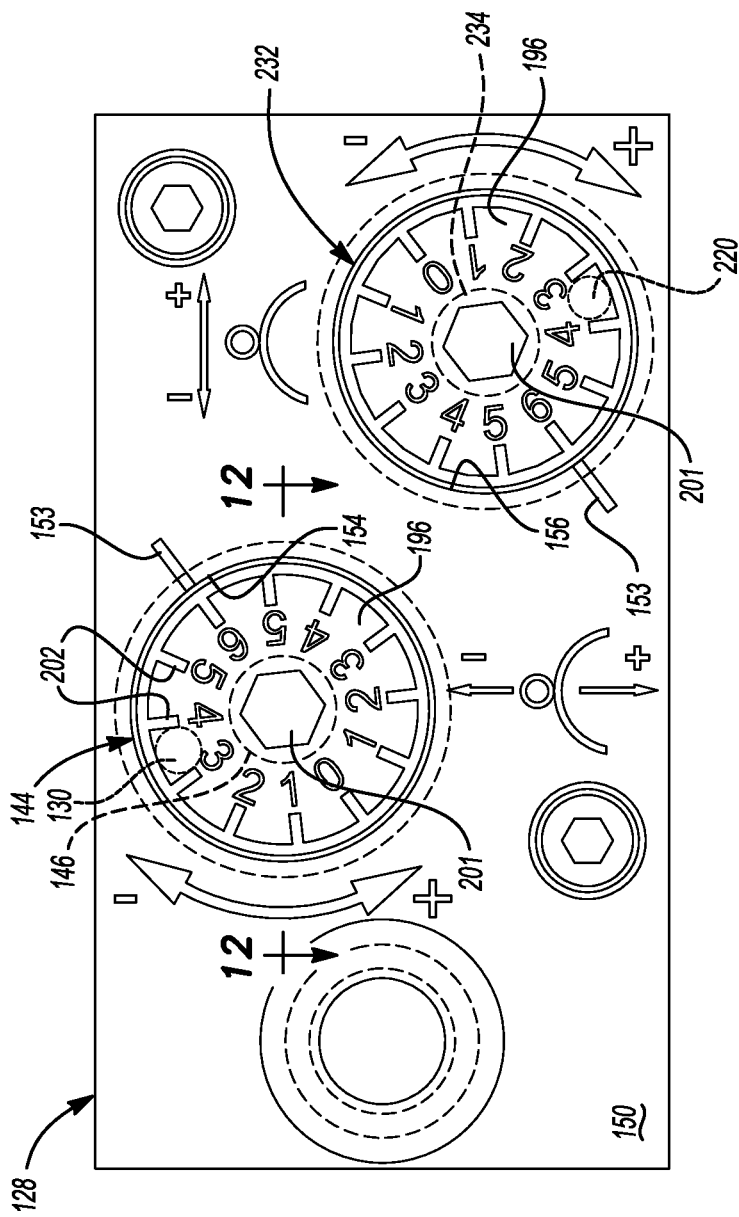
FIG. 11 is a plan view of an adjustment assembly of the adjustable fixture mechanism of FIG. 1.
Figure 14A:
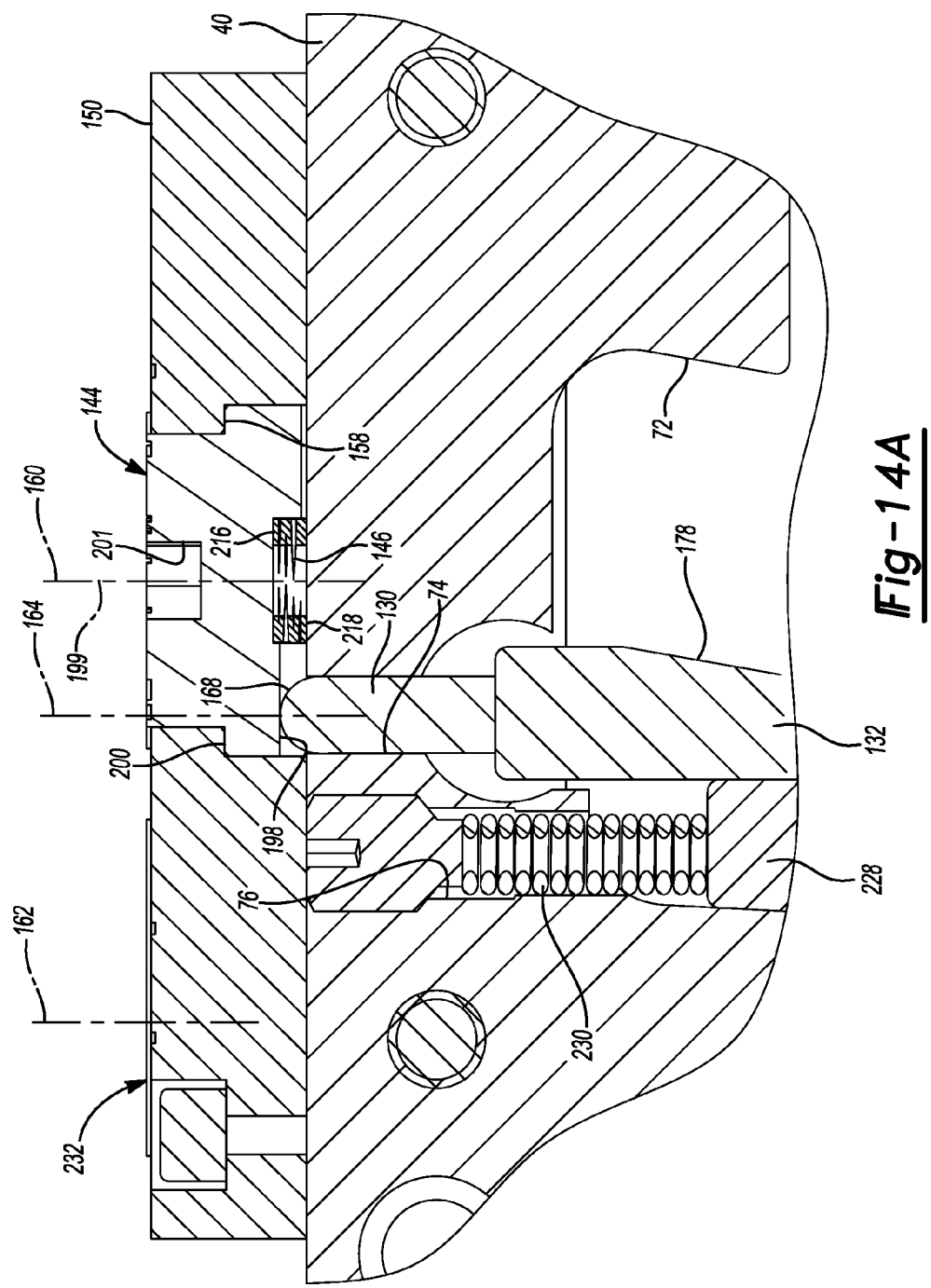
FIG. 14A is a cross-sectional view of the adjustment assembly of FIG. 1, showing the adjustment assembly in a first adjustment position.
Figure 14B:
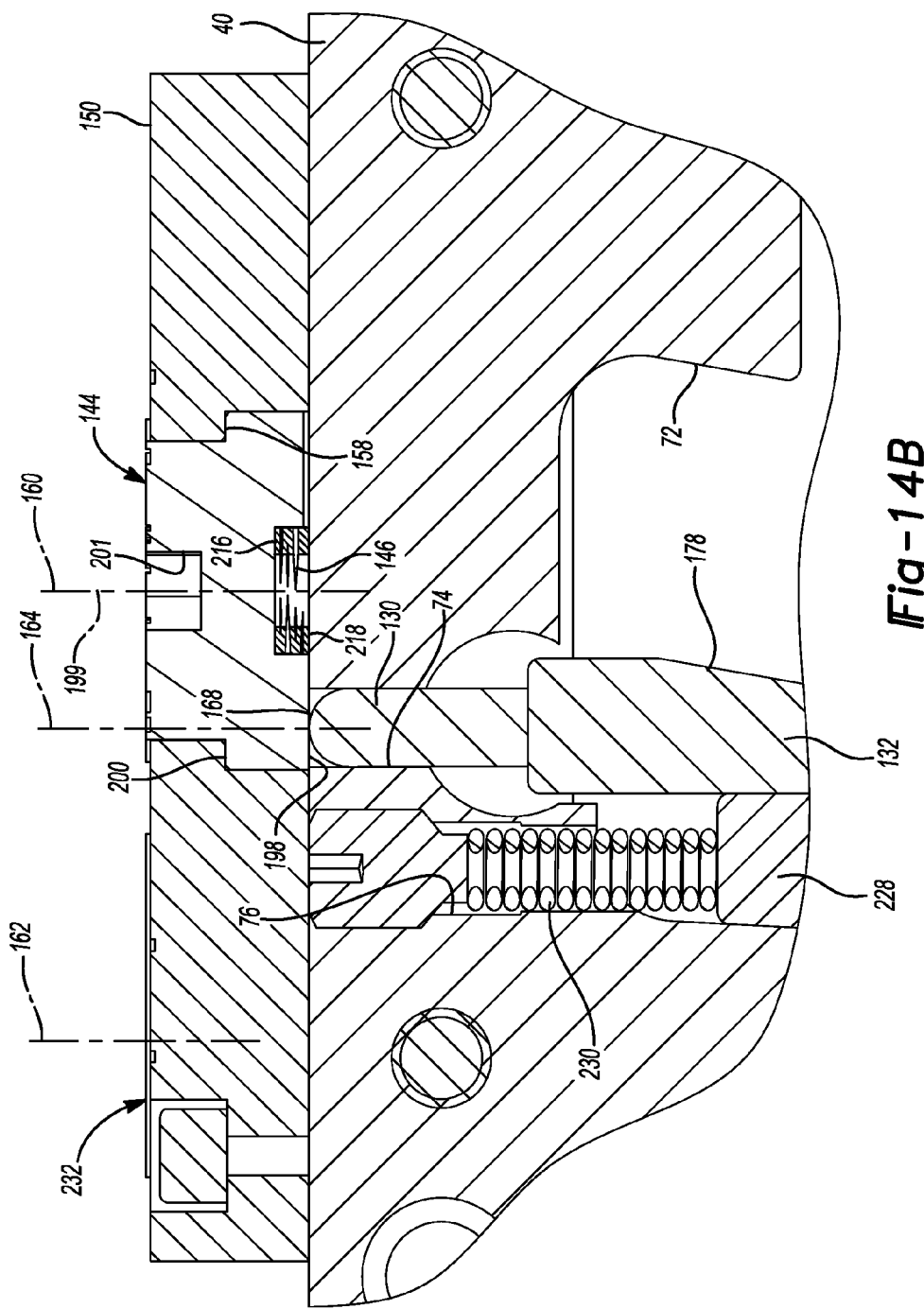
FIG. 14B is a cross-sectional view of the adjustment assembly of FIG. 1, showing the adjustment assembly in a second adjustment position.

As illustrated in FIGS. 1, 3 and 4, in an assembled configuration the adjustment control plate 128 may be coupled to at least one of the first side plate 38, the second side plate 40 and the first slide plate 44, such that the first adjustment control aperture 154 is in communication with the third adjustment bore 74 and the second adjustment control aperture 156 is in communication with the first adjustment bore 62. As illustrated in FIG. 11, the first and second control apertures 154, 156 may be eccentrically aligned with the rods 130, 220, respectively. In this way, the central axes 160, 162 of the first and second control apertures 154, 156 may be offset from the central axes 164, 166 of the third and first adjustment bores 74, 62, respectively, as illustrated in FIGS. 3 and 4.

The rod 130 may be a generally cylindrical member extending between a proximal end 168 and a distal end 170. As illustrated in FIG. 4, in an assembled configuration, the rod 130 may be disposed within the third adjustment bore 74.

With reference to FIG. 2, the first adjustment guide 132 may extend between a proximal end 172 and a distal end 174 and may further include a sliding surface 176 and a camming surface 178. The sliding surface 176 may be substantially planar and extend from and between the proximal and distal ends 172, 174. The camming surface 178 may oppose the sliding surface 176, and may define an arcuately shaped recess in the first adjustment guide 132. In an assembled configuration, the first adjustment guide 132 may be disposed within the leg 72b of the camming slot 72, such that the proximal end 172 of the first adjustment guide 132 engages the distal end 170 of the rod 130.

The first push rod 134 may be a generally cylindrical member extending between a proximal end 182 and a distal end 184. In an assembled configuration, the first push rod 134 may be at least partially disposed within the leg 72b of the camming slot 72, such that the proximal end 182 of the first push rod 134 engages the distal end 174 of the first adjustment guide 132.

The rocker member 136 may define a V-shape extending between a proximal end 186 and a distal end 188. In an assembled configuration, the rocker member 136 may be disposed within the channel 108, such that the proximal end 186 extends into the leg 72b of the camming slot 72 and the distal end 188 extends into the leg 60b of the camming slot 60. In this regard, the rocker member 136 can rock or otherwise pivot within the channel 108 while the proximal end 186 engages the distal end 184 of the push rod 134.

The second adjustment guide 138 may be substantially similar to the first adjustment guide 132. Accordingly, like reference numerals will be used to describe similar features. In the assembled configuration, the second adjustment guide 138 may be disposed within the leg 60b of the camming slot 60, such that the proximal end 172 engages the distal end 188 of the rocker member 136.

The second push rod 140 may be a generally cylindrical member extending between a proximal end 190 and a distal end 192. In an assembled configuration, the second push rod 140 may be at least partially disposed within the second adjustment bore 64, such that the proximal end 190 engages the distal end 174 of the second adjustment guide 138.

In some configurations, the first biasing member 142 may be a helical spring. It will be appreciated, however, that the first biasing member 142 may include other forms within the scope of the present disclosure. In an assembled configuration, the first biasing member 142 may be disposed within the second adjustment bore 64 such that the biasing member 142 can bias the second push rod 140 in the direction of the rocker member 136.

The adjustment control member 144 may extend between a proximal end 196 and a distal end 198 along an axis 199. The adjustment control member 144 may include a first portion 144a and a second portion 144b. In some configurations, the first and second portions 144a, 144b may be integrally and monolithically formed. It will be appreciated, however, that the first and second portions 144a, 144b may be separately formed and coupled together using mechanical fasteners, adhesive, welding, or any other suitable fastening technique known in the art.

The first portion 144a of the adjustment control member 144 may define a cylindrical shape extending from the proximal end 196. The first portion 144a may have a third diameter D3. The second portion 144b may define a cylindrical shape extending from the distal end 198. The second portion 144b may have a fourth diameter D4 that is greater than the third diameter D3. In this regard, the first portion 144a may be concentric to the second portion 144b such that the first and second portions define an annular shoulder or lip 200 extending therebetween.

As illustrated in FIG. 11, the proximal end 196 of the adjustment control member 144 may include a driving feature 201 and a plurality of indicia 202. In some configurations, the driving feature 201 may define a central aperture that can mate with a screwdriver, Allen wrench, or other similar driver otherwise known in the art. The indicia 202 may be raised or recessed and equally spaced around the perimeter of the proximal end 196. As illustrated, the indicia 202 may be numbered or otherwise labeled to identify the location of the indicia 202 relative to the metering feature 153.

As illustrated in FIG. 13, the distal end 198 of the adjustment control member 144 may include a ramped surface 204 extending about the axis 199. In this regard, the ramped surface 204 may be an annular surface extending from a proximal end 206 to a distal end 208. In some configurations the proximal end 206 is adjacent to, or otherwise aligned with, the distal end 208 such that the ramped surface 204 extends about the axis 199 by an angle $\theta$ substantially equal to three hundred sixty degrees. It will also be appreciated that the angle $\theta$ may be less than three hundred sixty degrees within the scope of the present disclosure.

The ramped surface 204 may have a radially extending width W1 that is less than a radius (one-half of the fourth diameter D4) of the first portion 144a of the adjustment control member 144, such that the ramped surface 204 at least partially defines a recess 212 in the distal end 198 of the adjustment control member 144.

In an assembled configuration, the adjustment control member 144 may be rotatably disposed in the first adjustment control aperture 154. In this regard, the first portion 144a may be disposed in the second portion 154b, and the second portion 144b may be disposed in the first portion 154a, such that the shoulder 158 engages the lip 200 to secure the adjustment control member 144 relative to movement along the axis 199. The cylindrical shape of the first and second portions 144a, 144b of the adjustment control member 144, and the cylindrical shape of the first and second portions 154a, 154b of the first adjustment control aperture 154 can cooperate with the shoulder 158 and the lip 200 to allow the adjustment control member to freely rotate within the adjustment control aperture without changing the position of the adjustment control member relative to the adjustment control aperture along the axis 199.

The second biasing member 146 may be disposed between the adjustment control member 144 and at least one of the supporting body 42 and the first side plate 38. In this regard, the second biasing member 146 may bias the shoulder 158 into sealing engagement with the lip 200 to help prevent dirt and other debris from entering the adjustment control aperture 154. In some configurations, the second biasing member 146 may be a helical spring having first and second ends 216, 218. In an assembled configuration, the first end 216 may be disposed in the recess 212 of the adjustment control member 144 and the second end 218 may engage at least one of the upper slide plate 44 and the first side plate 38.

The second adjustment subassembly 54 may include the adjustment control plate 128, a first adjustment member or rod 220, a third adjustment guide 222, a rocker member 224, a push rod 226, fourth adjustment guide 228, a third biasing member 230, an adjustment control member 232, and a fourth biasing member 234. As will be explained in more detail below, the second adjustment subassembly 54 can be used to adjust the vertical or longitudinal position of the second workpiece support pads 118 (thereby adjusting the vertical or longitudinal position of the centerline of a cylindrical workpiece when the workpiece is gripped by the support pads 101, 118), relative to the view in FIG. 3.

The rod 220 may be a generally cylindrical member extending between a proximal end 238 and a distal end 240. In an assembled configuration, the rod 220 may be disposed within the first adjustment bore 62.

The third adjustment guide 222 may extend between a proximal end 242 and a distal end 244 and may further include a first sliding surface 246 (FIG. 3) and a second sliding surface 248. The first sliding surface 246 may be substantially planar and extend from and between the proximal and distal ends 242, 244. The second sliding surface 248 may oppose the first sliding surface 246, and may be tapered relative to the first sliding surface 246. In an assembled configuration, the third adjustment guide 222 may be disposed within the leg 60b of the camming slot 60, such that the first sliding surface 246 engages the sliding surface 176 of the second adjustment guide 138, and the second sliding surface 248 engages a wall 252 of the camming slot 60. In the assembled configuration, the proximal end 242 of the third adjustment guide 222 engages the distal end 240 of the rod 220.

The rocker member 224 may be substantially similar to the rocker member 136, and may extend between a proximal end 254 and a distal end 256. In an assembled configuration, the rocker member 224 may be disposed within the channel 110, such that the proximal end 254 extends into the leg 60b of the camming slot 60 and the distal end 256 extends into the leg 72b of the camming slot 72. In this regard, the proximal end 254 can engage the distal end 244 of the third adjustment guide 222.

The push rod 226 may be a generally cylindrical member extending between a proximal end 258 and a distal end 260. In an assembled configuration, the push rod 226 may be at least partially disposed within the leg 72b of the camming slot 72, such that the proximal end 258 of the push rod 226 engages the distal end 256 of the rocker member 224.

The fourth adjustment guide 228 may be substantially similar to the third adjustment guide 222. Accordingly, like reference numerals will be used to describe similar features. In an assembled configuration, the fourth adjustment guide 228 may be disposed within the leg 72b of the camming slot 72, such that the first sliding surface 246 engages the sliding surface 176 of the first adjustment guide 132, and the second sliding surface 248 engages a wall 262 of the camming slot 72. In the assembled configuration, the fourth adjustment guide 228 may be disposed within the leg 72b of the camming slot 72, such that the proximal end 242 engages the distal end 260 of the push rod 226.

The third biasing member 230 may be a helical spring. In an assembled configuration, the third biasing member 230 may be at least partially disposed within the fourth adjustment bore 76 such that the third biasing member 230 can bias the fourth adjustment guide 228 in the direction of the rocker member 224.

The adjustment control member 232 may be substantially similar to the adjustment control member 144, except as otherwise provided herein. Accordingly, like numerals will be used to describe similar features and components. Likewise, in an assembled configuration, the adjustment control member 232 may be rotatably disposed in the second adjustment control aperture 156 in the manner described above with respect to the adjustment control member 144 and the first adjustment control aperture 154.

The fourth biasing member 234 may be substantially similar to the second biasing member 146. The fourth biasing member 234 may be disposed between the adjustment control member 232 and at least one of the upper slide plate 44 and the second side plate 56.

Figure 5:
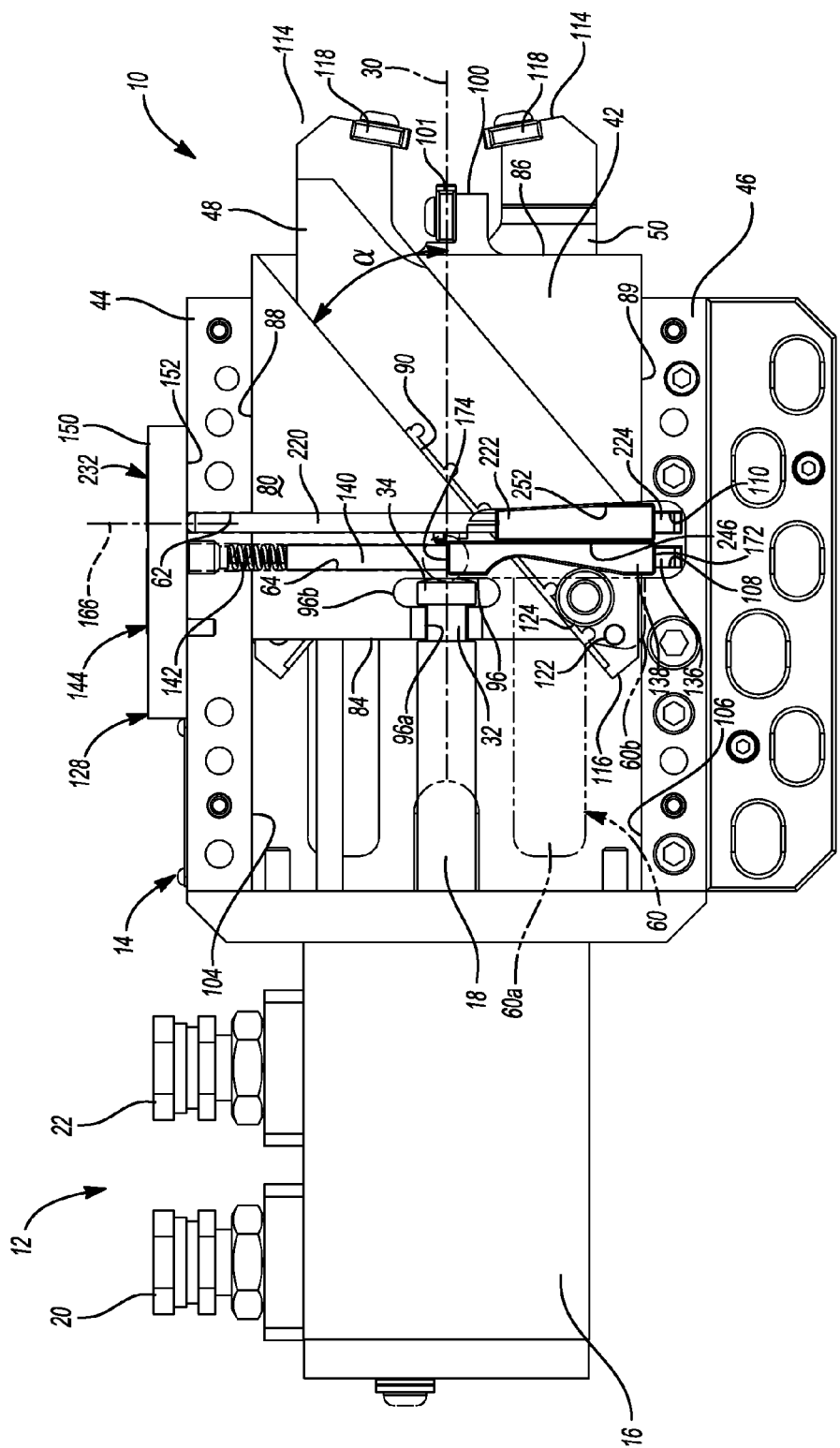
FIG. 5 is a side view of the first side of the adjustable fixture mechanism of FIG. 1, the adjustable gripping arms shown in a second position.
Figure 6:
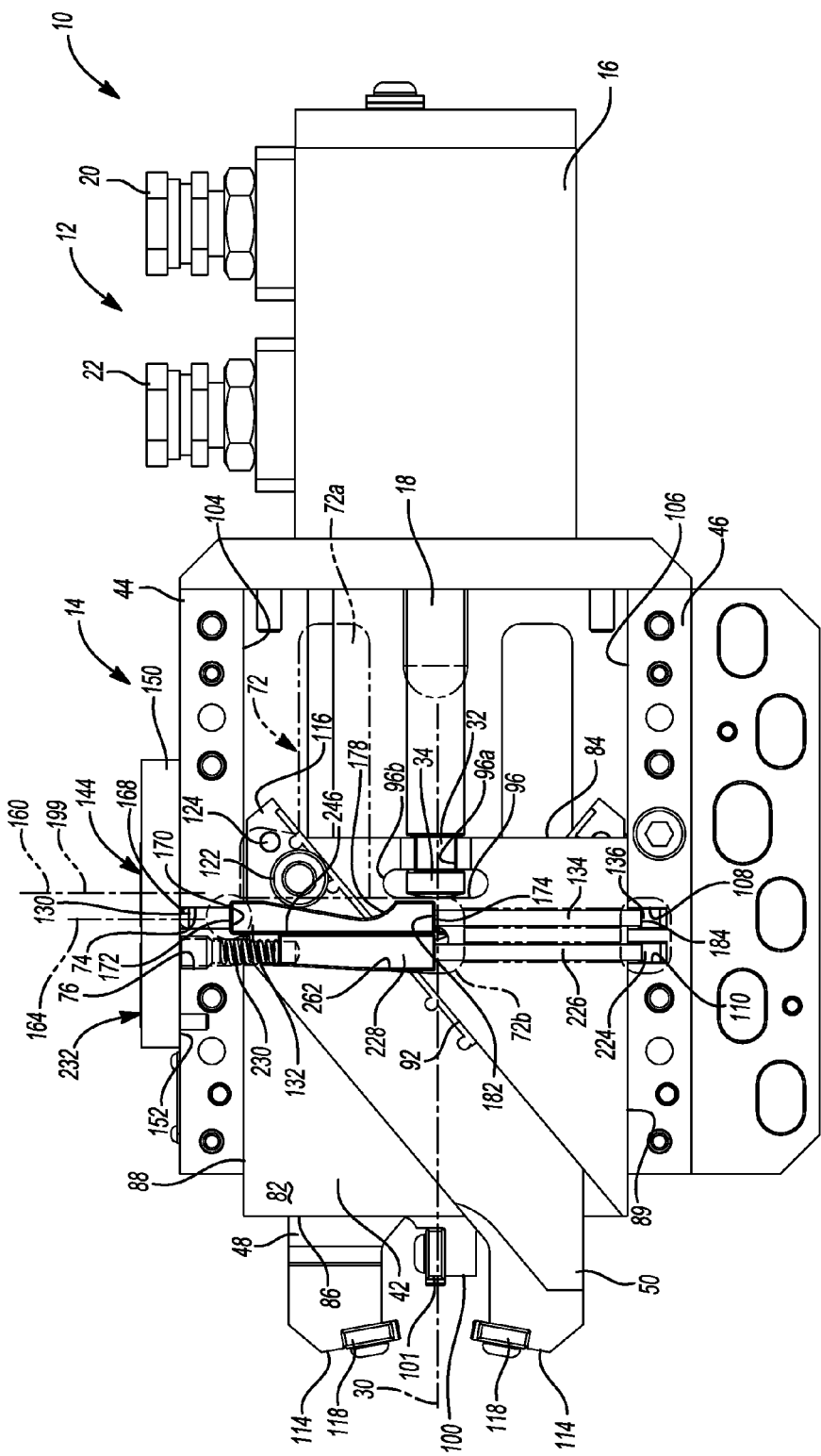
FIG. 6 is a side view of the second side of the adjustable fixture mechanism of FIG. 1, the adjustable gripping arms shown in the second position.
Figure 7:
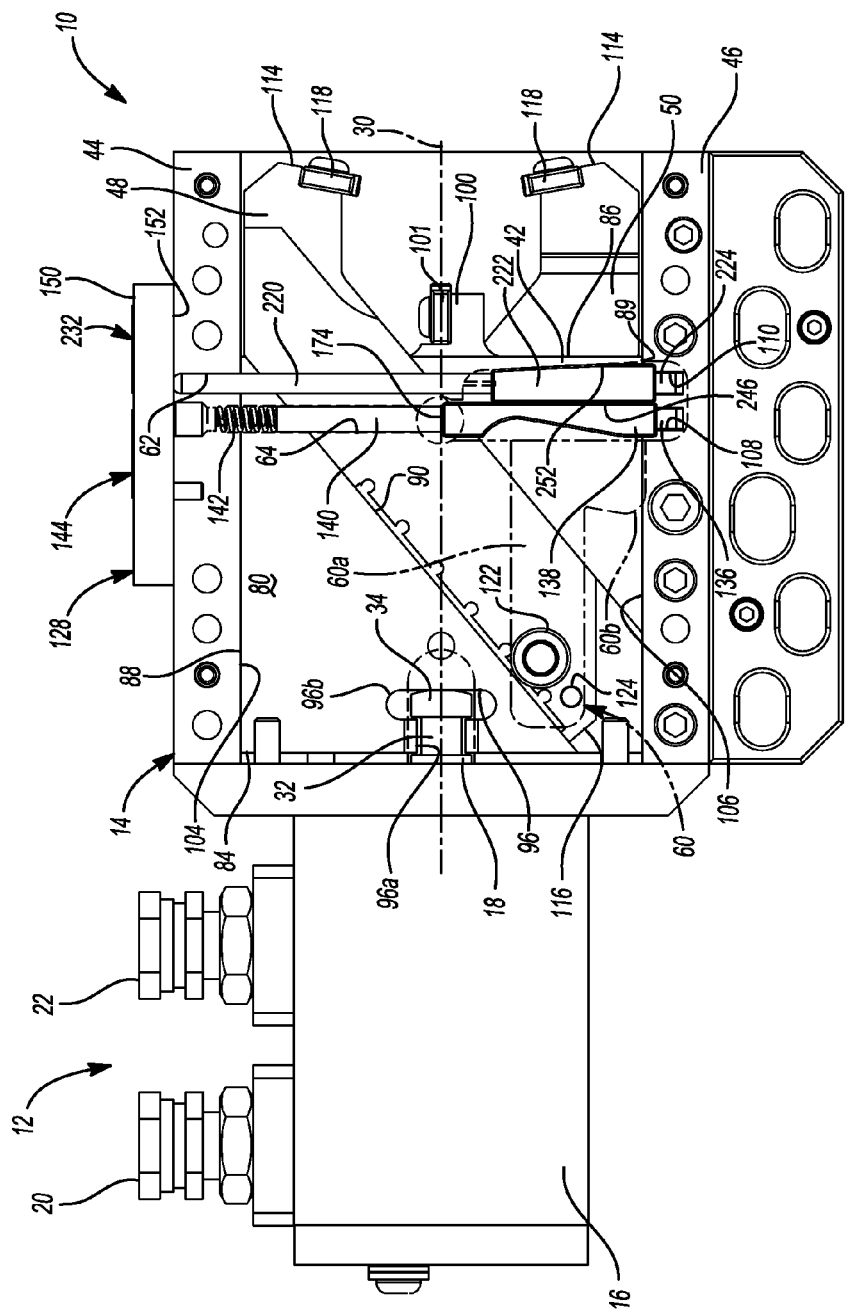
FIG. 7 is a side view of the first side of the adjustable fixture mechanism of FIG. 1, the adjustable gripping arms shown in a third position.
Figure 8:
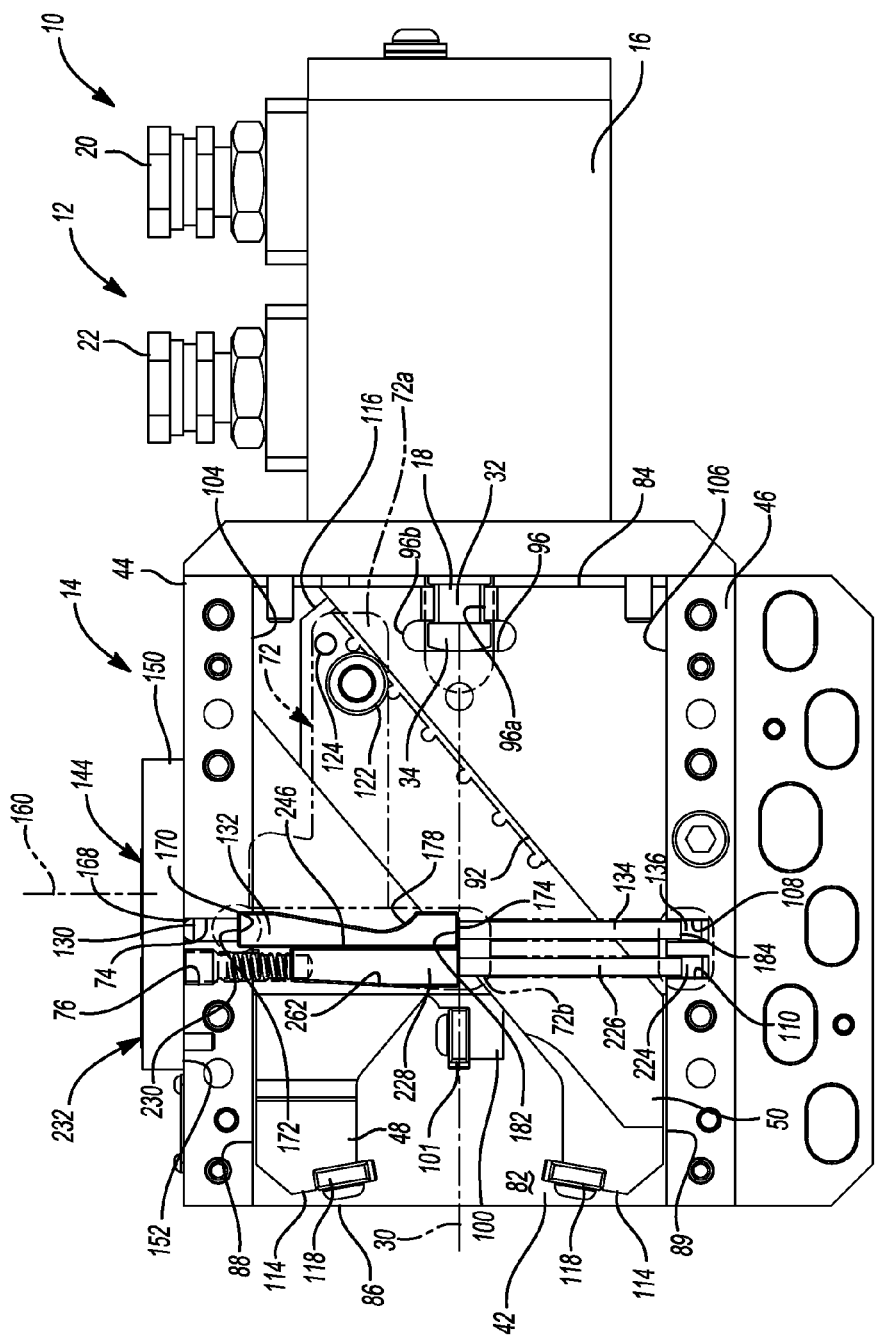
FIG. 8 is a side view of the second side of the adjustable fixture mechanism of FIG. 1, the adjustable gripping arms shown in the third position.

With reference to FIGS. 3-10, operation of the adjustable fixture mechanism 10 will now be described in more detail. In a first stage of operation, the supporting body 42 and the first and second gripping arms 48, 50 may be positioned substantially between the first and second side plates 38, 40 (FIGS. 7 and 8). In a second stage of operation, the actuator subassembly 12 may cause the rod 18 to extend from the housing 16, and thereby cause the supporting body 42 to slide between the first and second side plates 38, 40 (FIGS. 3 and 4). As the supporting body 42 slides between the first and second side plates 38, 40, the cam rollers 122 will contact the first and second adjustment guides 132, 138. Specifically, as shown in FIGS. 3 and 4, the cam rollers 122 will contact the camming surface 178 of the first and second adjustment guides 132, 138. As the supporting body 42 continues to slide between the first and second side plates 38, 40, the cam rollers 122 will roll, or otherwise move, along the camming surface 178, causing the first and second gripping arms 48, 50 to slide within the channels 90, 92, respectively, and into a gripping position (FIGS. 5 and 6).

With the first and second gripping arms 48, 50 in the gripping position, the user can utilize the adjustment control members 144 and 232 to accurately adjust the horizontal and vertical positions of the second workpiece support pads 118 precisely to desired positions without having to perform multiple iterations of adjusting and checking. By adjusting the horizontal and vertical positions of the second workpiece support pads 118, the user can horizontally and vertically adjust the location of the centerline of a cylindrical workpiece. Using the indicia 202 and metering feature 153, the user can rotate the adjustment control members 144, 232 relative to the adjustment control plate 128 a desired amount to effect a corresponding amount of movement of the support pads 118. In some configurations, rotating the adjustment control members 144, 232 an amount equal to the angular spacing between adjacent indicia 202 may cause corresponding movement of the support pads 118 of one micron (i.e., one micrometer). It will be appreciated that, in other configurations, the adjustment subassemblies 52, 54 could be configured so that rotating the adjustment control members 144, 232 by an amount equal to the angular spacing between adjacent indicia 202 may cause corresponding movement of the support pads 118 of more or less than one micron.

Figure 9:
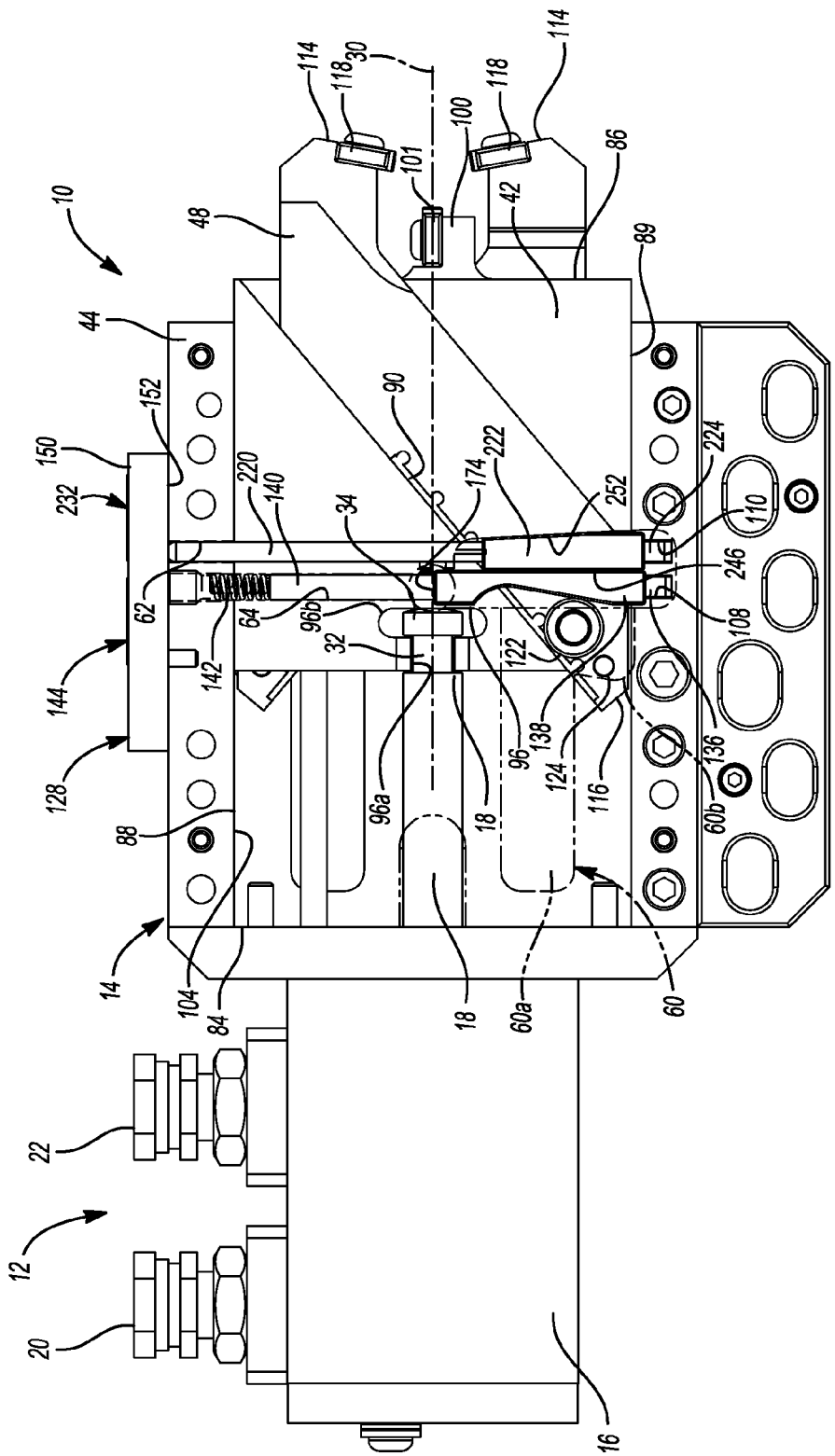
FIG. 9 is a side view of the first side of the adjustable fixture mechanism of FIG. 1, the adjustable gripping arms shown in a fourth position.
Figure 10:
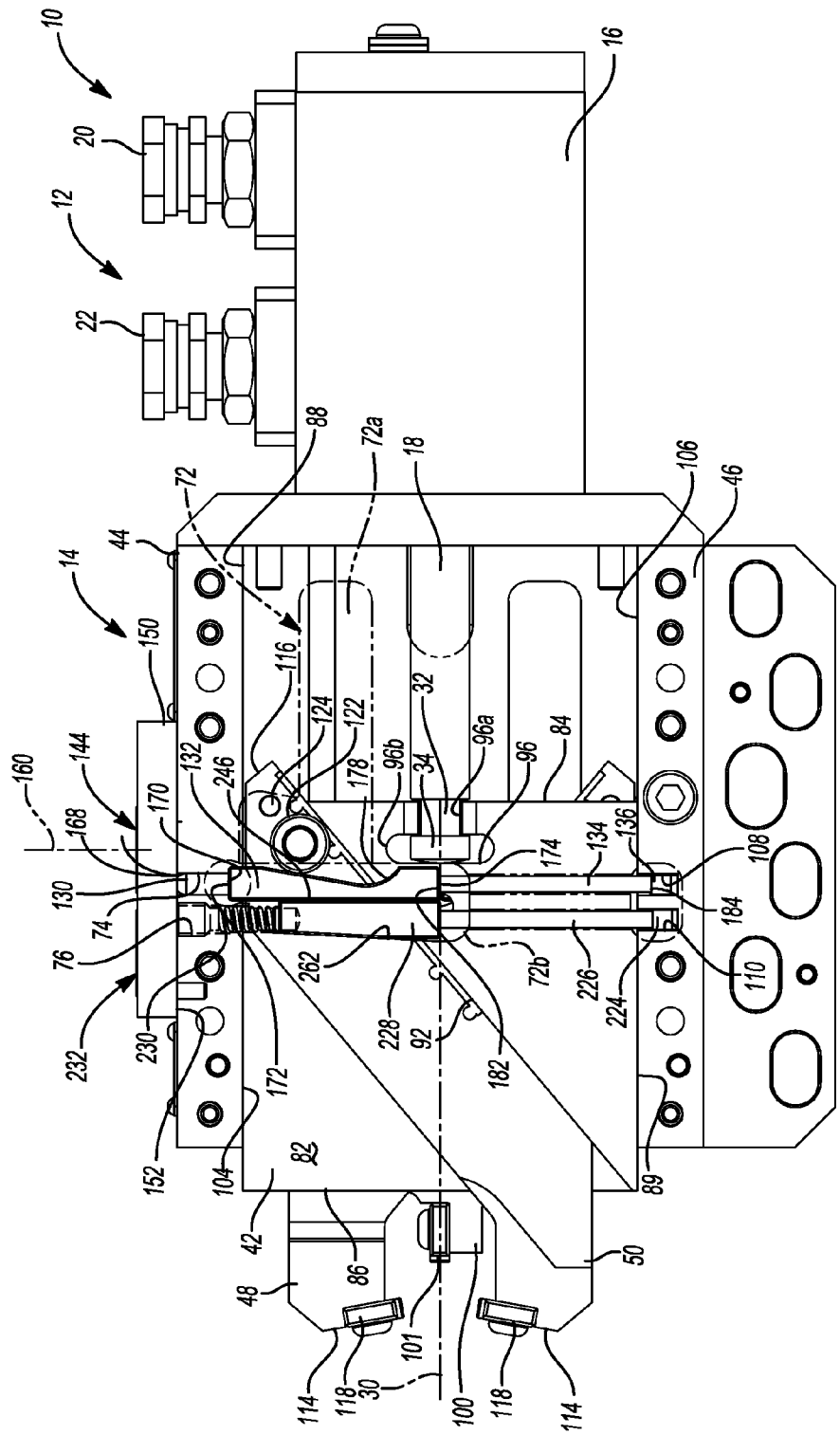
FIG. 10 is a side view of the second side of the adjustable fixture mechanism of FIG. 1, the adjustable gripping arms shown in the fourth position.

To adjust the horizontal position of the second workpiece pads 118, the user can rotate the adjustment control member 144. As the adjustment control member 144 rotates within the first adjustment control aperture 154, the ramped surface 204 may slide or otherwise move along the proximal end 168 of the rod 130. As the ramped surface 204 slides along the rod 130, the rod 130, the first adjustment guide 132, and the first push rod 134 are urged in a first direction substantially parallel to the axis 199, causing the rocker member 136 to pivot within the channel 108. As the rocker member 136 pivots within the channel 108, the second adjustment guide 138 and the second push rod 140 are urged in a second direction substantially parallel to the axis 199 and opposite the first direction. As the first adjustment guide 132 moves in the first direction, and the second adjustment guide 138 moves in the second direction, the cam rollers 122 will move along the camming surfaces 178, thereby causing the first and second gripping arms 48, 50 to slide within the channels 90, 92, respectively, and adjust the horizontal position of the gripping arms (FIG. 9).

In order to adjust the vertical position of the second workpiece pads 118, the user can rotate the adjustment control member 232. As the adjustment control member 232 rotates within the second adjustment control aperture 156, the ramped surface 204 may slide or otherwise move along the proximal end 238 of the rod 220. As the ramped surface 204 slides along the rod 220, the rod 220, the third adjustment guide 222 are urged in a first direction substantially parallel to the axis 199, causing the rocker member 224 to pivot within the channel 110. As the rocker member 224 pivots within the channel 110, the push rod 226 and the fourth adjustment guide 228 are urged in a second direction substantially parallel to the axis 199 and opposite the first direction. As the third adjustment guide 222 moves in the first direction, and the fourth adjustment guide 228 moves in the second direction, the first sliding surface 246 of the third adjustment guide 222 will slide along the sliding surface 176 of the second adjustment guide 138, and the second sliding surface 248 will slide along the wall 252 of the camming slot 60. Similarly, the first sliding surface 246 of the fourth adjustment guide 228 will slide along the sliding surface 176 of the first adjustment guide 132, and the second sliding surface 248 will slide along the wall 262 of the camming slot 72.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An adjustable fixture mechanism comprising:
a first housing having an adjustment aperture;
an adjustment control plate supported by the first housing, the adjustment control plate having an adjustment control aperture;
an adjustment member disposed within the adjustment aperture, the adjustment member including a proximal end, a distal end and a first central axis extending through the proximal and distal ends; and
an adjustment control member disposed within the adjustment control aperture, the adjustment control member including a proximal end and a distal end and rotatable within the adjustment control aperture about a second central axis that is offset from the first central axis, the distal end of the adjustment control member including a ramped surface extending about the second central axis, the ramped surface contacting the proximal end of the adjustment member,
wherein the distal end of the adjustment control member includes an axially extending recess.

2. The adjustable fixture mechanism of claim 1, wherein the ramped surface extends helically about the second central axis.

3. The adjustable fixture mechanism of claim 1, wherein the proximal end of the adjustment control member includes a plurality of indicia.

4. The adjustable fixture mechanism of claim 3, wherein the adjustment control plate includes at least one metering feature.

5. The adjustable fixture mechanism of claim 1, wherein the adjustment control member includes an annular lip and the adjustment control aperture includes an annular shoulder for engaging the annular lip to secure the adjustment control member within the adjustment control aperture.

6. The adjustable fixture mechanism of claim 5, further comprising a biasing member operable to bias the annular lip into engagement with the annular shoulder.

7. The adjustable fixture mechanism of claim 1, wherein the axially extending recess is at least partially defined by the ramped surface.

8. The adjustable fixture mechanism of claim 1, wherein a biasing member is at least partially disposed within the axially extending recess.

9. An adjustable fixture mechanism comprising:
a first housing having an adjustment aperture;
an adjustment control plate supported by the first housing, the adjustment control plate having an adjustment control aperture;
an adjustment member disposed within the adjustment aperture, the adjustment member including a proximal end, a distal end and a first central axis extending through the proximal and distal ends;
an adjustment control member disposed within the adjustment control aperture, the adjustment control member including a proximal end and a distal end and rotatable within the adjustment control aperture about a second central axis that is offset from the first central axis, the distal end of the adjustment control member including a ramped surface extending about the second central axis, the ramped surface contacting the proximal end of the adjustment member; and
a second housing, a supporting body, and a biasing member, the supporting body disposed between the first and second housing, the biasing member having a first end and a second end, the first end engaging the supporting body, the second end engaging the distal end of the adjustment control member.

10. The adjustable fixture mechanism of claim 9, wherein the distal end of the adjustment control member includes an axially extending recess at least partially defined by the ramped surface.

11. An adjustable fixture mechanism comprising:
a housing having an adjustment aperture;
an adjustment control plate coupled to the housing, the adjustment control plate having an adjustment control aperture;
an adjustment member disposed within the adjustment aperture, the adjustment member including a proximal end and a distal end; and
an adjustment control member disposed within the adjustment control aperture, the adjustment control member including a proximal end and a distal end, the distal end including a ramped helical surface, wherein the adjustment control member is eccentrically aligned with the adjustment member, such that the ramped helical surface engages the proximal end of the adjustment member,
wherein the adjustment control member includes an annular lip and the adjustment control aperture includes an annular shoulder for engaging the annular lip to secure the adjustment control member within the adjustment control aperture, the adjustable fixture mechanism further comprising a biasing member operable to bias the annular lip into engagement with the annular shoulder.

12. The adjustable fixture mechanism of claim 11, wherein the adjustment control member is rotatable within the adjustment control aperture.

13. The adjustable fixture mechanism of claim 12, wherein the proximal end of the adjustment control member includes a plurality of indicia.

14. The adjustable fixture mechanism of claim 13, wherein the adjustment control plate includes at least one metering feature.

15. The adjustable fixture mechanism of claim 11, wherein the distal end of the adjustment control member includes an axially extending recess.

16. The adjustable fixture mechanism of claim 15, wherein the axially extending recess is at least partially defined by the ramped surface.

17. The adjustable fixture mechanism of claim 16, wherein a biasing member is at least partially disposed within the axially extending recess.

18. The adjustable fixture mechanism of claim 11, further comprising a second housing, a supporting body, and a biasing member, the supporting body disposed between the first and second housing, the biasing member having a first end and a second end, the first end engaging the supporting body, the second end engaging the distal end of the adjustment control member.

* * * * *